United States Patent [19]

Edström

[11] 4,063,476

[45] Dec. 20, 1977

[54] METHOD AND APPARATUS FOR CUTTING A CONTINUOUSLY MOVING WEB

[75] Inventor: Lennart Edström, Grodinge, Sweden

[73] Assignee: Aktiebolaget Broderne Herrmann, Stockholm, Sweden

[21] Appl. No.: 676,381

[22] Filed: Apr. 13, 1976

[30] Foreign Application Priority Data

Apr. 29, 1975 Sweden ............................... 7504997

[51] Int. Cl.[2] ............................................. B23D 25/04

[52] U.S. Cl. ........................................... 83/37; 83/341; 83/428

[58] Field of Search ....................... 83/425.1, 428, 483, 83/485, 37, 341; 242/5.66

[56] References Cited

U.S. PATENT DOCUMENTS

| | | | |
|---|---|---|---|
| 2,395,352 | 2/1946 | Stude et al. | 83/428 X |
| 2,605,840 | 8/1952 | Parker | 83/483 X |
| 2,969,930 | 1/1961 | Zernov | 83/428 X |
| 3,282,525 | 11/1966 | Rehr | 83/423 X |

FOREIGN PATENT DOCUMENTS

| | | | |
|---|---|---|---|
| 1,187,365 | 2/1965 | Germany | 83/485 |

*Primary Examiner*—Othell M. Simpson
*Assistant Examiner*—John Sipos
*Attorney, Agent, or Firm*—Burns, Doane, Swecker & Mathis

[57] ABSTRACT

Continuous cutting of a web, in motion, is effected by passing the web over a roll against which web and roll there is pressed a rotatable circular cutter, at an angle with respect to the longitudinal axis of the roll.

13 Claims, 3 Drawing Figures

METHOD AND APPARATUS FOR CUTTING A CONTINUOUSLY MOVING WEB

This invention relates to a method of cutting a web during its continuous movement and to an apparatus for carrying out the method. The term "cut" in this connection is to be understood so that the web is cut off entirely or is only more or less provided with perforations, a so-called intermittent cutting.

In many connections, a web, e.g. a paper web, plastic web or a web of other material, is to be cut while moving continuously, in order a.o. to obtain a high running speed of the web, for example when a completely wound roll of the web is exchanged against a new bobbin.

Such cutting of a continuously moving web involves great difficulties, particularly at high web speeds.

Heretofore, the cutting usually was carried out perpendicularly to the running web by a.o. knocking-off or burning-off the web by means of a heated string, in which cases the web is cut off entirely. It is then very difficult to catch the free web end running ahead, and very accurate procedures in the device for exchanging the rolls are required.

Another usual method is to cut through the running web with a knife, either completely from one edge to the other or by leaving the edges uncut. In the first case difficulties arise in catching the web end, as indicated above. In the latter case when the web edge is unbroken, it is difficult to separate the web at the edges holding together. In many cases the web is caught to a new roll just at one of the edges and, therefore, also this method provides difficulties.

The present invention has the object of rendering possible cutting by a fully automatic cutting operation entirely controlled and driven by the movement of the web, in such a manner, that the web can be cut off directly or be perforated or cut intermittently. Due to the cutting being carried out in a direction oblique to the longitudinal direction of the web, the web can safely and simply be caught onto e.g. a new bobbin at the web edge running ahead as a leading point. The intermittent cutting also eliminates the problem of leading the free end of the web to the new bobbin, and it provides the possibility to position the cutting apparatus according to the invention optionally within the web handling machine and at the same time to utilize the cutting apparatus as a transmitter ensuring the automatic roll exchange to start at the right moment.

The aforesaid advantages are achieved by the present invention showing the characterizing features defined in the claims.

Figure 1:
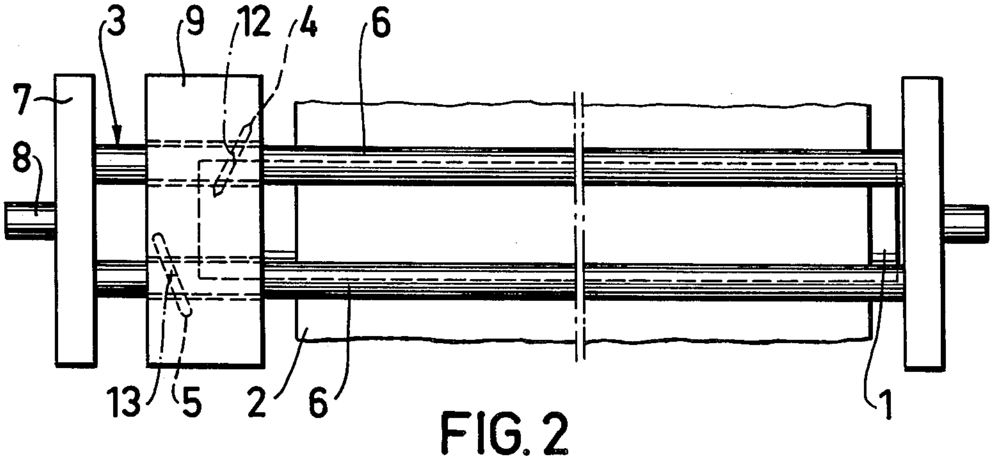
Figure 2:
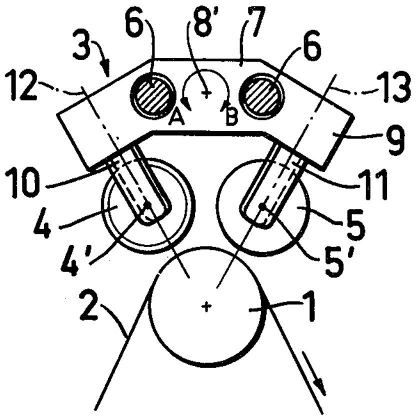
Figure 3:
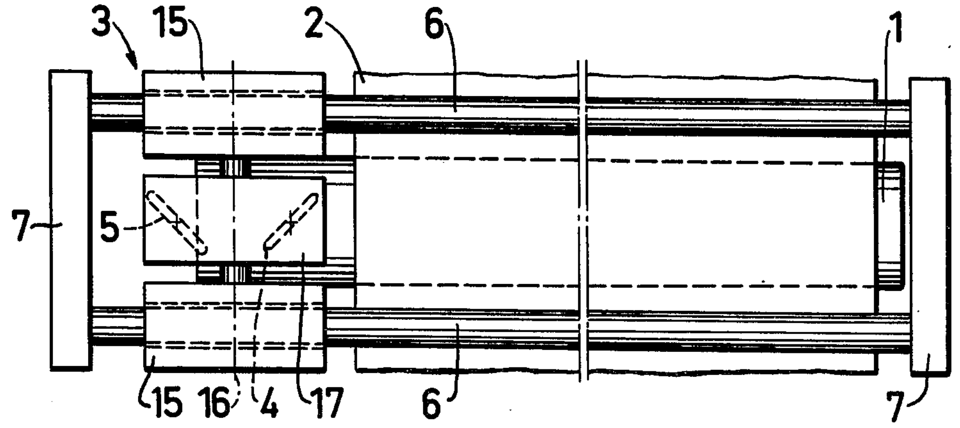

The invention is described in greater detail in the following by way of two embodiments, with reference to the accompanying drawings, in which FIG. 1 shows an embodiment of the cutting apparatus seen in a plane in parallel with the axle of the roll, FIG. 2 shows the cutting apparatus according to FIG. 1 seen in a plane perpendicular to the axle of the roll, and FIG. 3 shows a different design of the cutting apparatus seen in a view corresponding to FIG. 1.

The invention is described with reference to the apparatus whereby also the method according to the invention becomes apparent.

The cutting apparatus comprises a roll 1, which is freely rotatably mounted in a machine frame (not shown), and on which the web 2 to be cut runs. Along the roll 1 extends a cradle 3 carrying a circular cutter 4 and a return wheel 5.

The cradle 3 consists of a pair of guides 6 in the form of round rods extending in parallel with each other and the axle of the roll 1. The guides 6 have a length exceeding that of the roll 1 and are rigidly interconnected at their respective ends by means of a pair of yokes 7. The yokes in their turn are pivotally mounted in the machine frame (not shown) by means of journals 8. The centre of rotation for the yokes 7 in FIG. 2 is designated by 8'.

A slide 9 guided along the guides 6 carries said circular cutter 4 and return wheel 5. The cutter and wheel, respectively, are supported freely rotatably about an axle 4' and 5', respectively, which in their turn are arranged at forks 10 and 11, respectively, which are adjustably rotatably located in the slide 9.

As appears from FIG. 2, upon pivotal movement of the cradle 3 and therewith of the slide 9 in the direction of the arrow A, the circular cutter 4 is pressed against the roll 1 and the web 2 running thereon while the return wheel 5 is lifted from the roll 1. When, however, the cradle is pivoted in the direction of the arrow B, the return wheel 5 is pressed against the roll 1 and the web 2 running thereon, while the circular cutter 4 is lifted from the roll 1.

When the position of the slide 9 shown in FIG. 1 is regarded as its starting position, the circular cutter 4 by its oblique position and contact against the roll 1 and web 2 will travel along the roll due to the freely movable slide 9 and cut the web 2 obliquely to the longitudinal direction of the web. Depending on whether the circular cutter 4 is provided with a continuous cutting edge or a toothed one, it is possible to cut off the web 2 or only to cut it intermittently.

When the circular cutter 4 has moved along the entire roll 1, the cutter finally ends up outside the (right-hand) end of the roll 1.

The slide 9 then stops. The return wheel 5, as shown in FIG. 1, is supported on the slide 9 slightly axially offset (to the left), and therefore, after the stopping of the slide 9, the wheel 5 remains above the roll 1. By now turning the cradle 3 in the direction of the arrow B and pressing the return wheel 5 against the roll 1, the wheel due to its oblique position travels along the roll in the opposed direction and takes the slide 9 along. The return wheel finally ends up outside of the roll as shown in FIG. 1, and the slide 9 stops with the circular cutter located over the roll 1 and ready to be pressed against the same at the next cutting operation.

As understood implied, the slide 9 with the circular cutter 4 and wheel 5 is driven only by the friction between the roll 1 or web and the cutter 4 and wheel 5, respectively. The wheel may preferably be provided along its circumference with a friction-increasing material.

In order to obtain a satisfactory operation of the circular cutter 4 and return wheel 5, and to prevent slipping or slithering against the roll 1 or web 2, the axles 12 and 13, about which the cutter 4 and wheel 5, respectively, can be placed obliquely, must extend through the axis of rotation of the roll 1.

This slanting angle as stated above is adjustable. It was found that at web speeds of up to about 150 m/min a slanting angle of 45° of the cutter 4 can be used.

Depending on the web speed and slanting angle, it is possible to adjust the angle at which the web is cut.

In FIG. 3 a different embodiment of the invention is shown, at which the yokes 7 with the guides 6 are rigidly attached to the machine frame (not shown).

A slide running freely movably along the guides 6 consists of two portions 15 guided by the guides and a third portion 17 pivotal between the same about an axle 16. The axle 16 extends perpendicularly to the axle of the roll 1. Due to the cutter 4 and return wheel 5 lying axially in relation to the axle of the roll 1 instead of substantially radially offset as at the aforedescribed embodiment, the same result is achieved as at said embodiment when the portion 17 is pivoted in one direction or the other.

The pivotal movement of the yokes 7 and slide portion 17, respectively, can take place either manually or fully automatically, for example controlled by the material web (not shown) wound to a roll. The pivoting positions can preferably be locked.

The cutting and, respectively, return operation, of course, can be interrupted at any time during the movement of the slide 9, 15, 17 along the roll 1.

By replacing in principle the return wheel 5 by an additional circular cutter it is, of course, also possible to effect cutting in the opposed working direction.

What I claim is:

1. A method of cutting a web during its continuous movement, which comprises passing the web over a roll having a longitudinal axis,
pressing against the roll and therewith against the web a freely rotatable circular cutter freely movable, along the longitudinal axis of the roll, across the web at an angle in relation to the longitudinal axis of the roll,
moving said circular cutter across the web, said movement being effected only by the diagonal orientation of the cutter to the web and by the continuous movement of the web.

2. A method according to claim 1, characterized in that after the circular cutter has moved across and cut the web it is returned to its starting position, without contacting the web or roll, by means of a return wheel connected to the circular cutter and adapted to be pressed against the roll and therewith against the web at an angle relative to the longitudinal axis of the roll.

3. A method according to claim 2, wherein the return wheel is a second circular cutter.

4. An apparatus for cutting a web during its continuous movement, characterized in that it comprises a roll having a longitudinal axis, on which the web runs, a cradle extending along the roll, a slide freely movable along the cradle, and a freely rotatable circular cutter attached to the slide and adapted to be pressed against the roll, which cutter is located at a certain slanting angle relative to the longitudinal axle of the roll and freely movable across the web, said circular cutter being freely movable across the web only by the diagonal orientation of the cutter to the web and by the continuous movement of the web.

5. An apparatus according to claim 4, characterized in that the slide is rockable about an axle in parallel with the longitudinal axle of the roll.

6. An apparatus according to claim 4, characterized in that the cradle is rockable about an axle in parallel with the longitudinal axle of the roll.

7. An apparatus according to claim 4, characterized in that the slide is rockable about an axle perpendicular to the longitudinal axle of the roll.

8. An apparatus according to claim 6, characterized in that the cradle comprises two guides in parallel with each other and the longitudinal axle of the roll, which guides at their respective ends are interconnected by means of a yoke, which yokes are supported rockably in a frame carrying the apparatus, and the slide is freely movable along the guides.

9. An apparatus according to claim 4, characterized in that the slide is provided with a freely rotatable return wheel adapted to be pressed against the roll and located at a certain angle in relation to the longitudinal axle of the roll.

10. An apparatus according to claim 9, characterized in that the return wheel is located in the slide offset peripherally with respect to the roll surface from the circular cutter, and upon pressing of the circular cutter against the roll the return wheel is lifted over the roll surface, and vice versa.

11. An apparatus according to claim 9, characterized in that the return wheel is located in the slide offset axially with respect to the roll from the circular cutter, and upon pressure of the circular cutter against the roll the return wheel is lifted over the roll surface, and vice versa.

12. An apparatus according to claim 10, characterized in that the return wheel is located offset also axially, with respect to the roll, from the circular cutter.

13. An apparatus according to claim 9, characterized in that the return wheel is designed as a second circular cutter.

* * * * *